United States Patent
Andrews et al.

(10) Patent No.: US 11,060,841 B2
(45) Date of Patent: Jul. 13, 2021

(54) NON-INVASIVE THICKNESS MEASUREMENT USING FIXED FREQUENCY

(71) Applicant: Duke University, Durham, NC (US)

(72) Inventors: Joseph Batton Andrews, Durham, NC (US); Martin Brooke, Hillsborough, NC (US); Aaron Franklin, Cary, NC (US)

(73) Assignee: DUKE UNIVERSITY, Durham, NC (US)

( * ) Notice: Subject to any disclaimer, the term of this patent is extended or adjusted under 35 U.S.C. 154(b) by 454 days.

(21) Appl. No.: 16/086,147

(22) PCT Filed: May 29, 2018

(86) PCT No.: PCT/US2018/034872
§ 371 (c)(1),
(2) Date: Sep. 18, 2018

(87) PCT Pub. No.: WO2018/226449
PCT Pub. Date: Dec. 13, 2018

(65) Prior Publication Data
US 2020/0300599 A1    Sep. 24, 2020

Related U.S. Application Data

(60) Provisional application No. 62/587,660, filed on Nov. 17, 2017, provisional application No. 62/515,245, filed on Jun. 5, 2017.

(51) Int. Cl.
*G01B 7/06* (2006.01)
*B60C 25/00* (2006.01)
(Continued)

(52) U.S. Cl.
CPC ............... *G01B 7/06* (2013.01); *B60C 19/00* (2013.01); *B60C 25/007* (2013.01); *B60C 25/0551* (2013.01); *B60C 2019/004* (2013.01)

(58) Field of Classification Search
CPC .......... G01B 7/06; G01B 15/02; B60C 19/00; B60C 25/007; B60C 25/0551;
(Continued)

(56) References Cited

U.S. PATENT DOCUMENTS 4,623,835 A    11/1986   Mehdizadeh et al.
4,799,177 A    1/1989    Sarr
(Continued)

FOREIGN PATENT DOCUMENTS

CN    2172857 Y     7/1994
CN    203824513 U   9/2014
(Continued)

OTHER PUBLICATIONS

Andrews, J. et al., "Noninvasive Material Thickness Detection by Aerosol Jet Printed Sensors Enhanced Through Metallic Carbon Nanotube Ink", IEEE Sensos Journal, vol. 17, No. 14, Jul. 15, 2017, pp. 4612-4618, IEEE.

*Primary Examiner* — Huy Q Phan
*Assistant Examiner* — Zannatul Ferdous
(74) *Attorney, Agent, or Firm* — Coats & Bennett, PLLC

(57) ABSTRACT

A method of measuring thickness of a material generally includes applying an oscillating signal to a first electrode at a fixed frequency, passing the signal through the material to a second electrode, and measuring the magnitude of the signal reflected back to the first electrode. The thickness of the material is determined based on the measured magnitude of the reflected signal by: 1) comparing the determined magnitude to a predetermined baseline to establish a difference; and 2) identifying the thickness based on the differ-
(Continued)

ence. Related apparatuses are also disclosed. The material may be a vehicle tire.

20 Claims, 4 Drawing Sheets

(51) Int. Cl.
  *B60C 19/00* (2006.01)
  *B60C 25/05* (2006.01)
(58) Field of Classification Search
  CPC . B60C 2019/004; B60C 11/243; G01R 27/04; G01R 27/08; G01R 27/26; G06F 15/00; G01N 21/00
  See application file for complete search history.

(56) References Cited

U.S. PATENT DOCUMENTS

| | | | |
|---|---|---|---|
| 5,075,979 A | 12/1991 | Foskett | |
| 5,093,626 A | 3/1992 | Baer et al. | |
| 5,216,372 A | 6/1993 | Zoughi et al. | |
| 6,496,018 B1 | 12/2002 | Nagata et al. | |
| 6,794,886 B1 | 9/2004 | Chen et al. | |
| 6,989,675 B2 | 1/2006 | Kesil et al. | |
| 7,135,869 B2 | 11/2006 | Sergoyan et al. | |
| 7,775,094 B2 | 8/2010 | Awad | |
| 8,531,329 B2 | 9/2013 | Mahler | |
| 8,794,058 B2 | 8/2014 | Bigot et al. | |
| 9,797,703 B2 * | 10/2017 | Andrews | G01B 7/06 |
| 2005/0156606 A1 * | 7/2005 | Sergoyan | G01B 15/02 324/635 |
| 2008/0013070 A1 | 1/2008 | Kawate | |
| 2008/0168833 A1 * | 7/2008 | Awad | B60C 11/243 73/146 |
| 2010/0256951 A1 * | 10/2010 | Konermann | G01B 7/087 702/170 |
| 2014/0333329 A1 * | 11/2014 | Jeong | G01B 7/085 324/671 |
| 2016/0298957 A1 | 10/2016 | Little, Jr. | |
| 2017/0153108 A1 | 6/2017 | Kitazawa et al. | |
| 2017/0307349 A1 | 10/2017 | Andrews et al. | |
| 2017/0347460 A1 | 11/2017 | Cao et al. | |

FOREIGN PATENT DOCUMENTS

| | | |
|---|---|---|
| JP | 2014178271 A | 9/2014 |
| JP | 2014227125 A | 12/2014 |
| TW | 201205058 A | 2/2012 |
| TW | 201518681 A | 5/2015 |
| WO | 2006134237 A1 | 12/2006 |

\* cited by examiner

NON-INVASIVE THICKNESS MEASUREMENT USING FIXED FREQUENCY

This application claims the benefit of U.S. Provisional Application No. 62/515,245, filed Jun. 5, 2017, and U.S. Provisional Application No. 62/587,660, filed Nov. 17, 2017, the disclosures of both of which are incorporated herein by reference in their entirety.

BACKGROUND

The present invention relates to thickness measurements, and particularly to non-invasive thickness measurements using reactive near-field electromagnetic measurements, which in some aspects may have particular applicability to measuring thickness of a vehicle tire.

Measuring the thickness of a material can be accomplished in a variety of ways. For example, a material sample may be cut from the material and then physically or optically measured. Alternatively, the material may be punctured by a suitable device, and the thickness measured thereby. However, for some materials, it may be undesirable to damage the material in order to measure the thickness of the material. Accordingly, some physically non-invasive thickness measurement techniques have been developed. For example, U.S. Pat. No. 7,135,869 describes an approach that utilizes a cavity resonator that is closed off by being placed against a coated metallic surface, with the thickness of the coating being determined based on the resulting resonate frequency of the cavity resonator. However, such an approach requires the presence of a metallic substrate, a homogenous coating layer, physical access to the exposed surface of the coating, and that the cavity resonator be placed physically against the coating, some or all of which may be inappropriate for other situations than for testing coating thickness on an aircraft wing. Likewise, U.S. Pat. No. 5,093,626 teaches a contact measuring device for determining dry film thickness of paint using a hand held probe, but the paint must be on a conductive primer film. And, U.S. Pat. No. 9,797,703 teaches a non-invasive thickness measuring technique using resonant frequency shift that relies on sweeping across a frequency band of input frequencies, but sweeping frequencies introduces complexity and may not be desirable in all situations.

Thus, while the prior art approaches to thickness measurements may be suitable for some situations, they may not be ideal for all situations. Accordingly, there remains a need for alternative approaches to measuring the thickness of a material, particularly methods that are physically non-invasive, and to corresponding apparatuses.

SUMMARY

Described below are one or more methods of measuring thickness of a material, and/or to related apparatuses. The method generally includes applying an oscillating signal to a first electrode at a fixed frequency, passing the signal through the material to a second electrode, and measuring the magnitude of the signal reflected back to the first electrode. The thickness of the material is determined based on the measured magnitude of the reflected signal by: 1) comparing the determined magnitude to a predetermined baseline to establish a difference; and 2) identifying the thickness based on the difference.

In one or more aspects, the present disclosure provides a method of determining a thickness of a material. The method comprises: a) applying an oscillating transmit signal to a first electrode affixed to the material; wherein the transmit signal is applied at a fixed frequency; b) passing the transmit signal through the material; c) reflecting the transmit signal at a second electrode after the transmit signal has passed through the material, the second electrode disposed in spaced relation to the first electrode and electrically isolated therefrom; the second electrode affixed to the material; d) receiving the reflected signal at the first electrode; e) measuring a magnitude of the reflected signal at the fixed frequency; f) determining the thickness of the material based on the measured magnitude. The determining the thickness includes: comparing the determined magnitude to a predefined baseline value to establish a difference, the predefined baseline value corresponding to an initial thickness of the material and being established before the applying the oscillating signal to the first electrode; and then identifying the thickness based on the difference. In some aspects, the fixed frequency is in the range 300 MHz to 900 MHz, sometimes in the range 477 MHz to 487 MHz.

In some aspects, the method may further include determining the fixed frequency prior to the applying the oscillating signal. The determining the fixed frequency may include: a) transmitting a sweep signal from the first electrode while a frequency of the sweep signal is varied over time so that the signal is transmitted at a plurality of frequencies in corresponding time intervals; b) determining a resonant frequency based on a reflection of the sweep signal by the second electrode; and c) setting the fixed frequency as being within 20% of the determined resonant frequency. The fixed frequency may advantageously be set to be less than the determined resonant frequency. The fixed frequency may advantageously be set to any other values closer than 20% to the determined resonant frequency, such 19%, or 10%, or 5%, or 0%.

In some aspects, the first electrode and the second electrode are disposed substantially parallel to each other.

In some aspects, the identifying the thickness comprises using the difference to reference a look-up table of stored values. In some aspects, the identifying the thickness comprises calculating the thickness based on the difference and a stored predefined value.

In some aspects, the material comprises metal embedded in a dielectric material, such as a portion of a vehicle tire, with or without a steel reinforcing mesh.

In other aspects, the present disclosure provides a system for determining the thickness of the material that uses one or more methods described herein. For example, the disclosure provides a measurement system for determining a thickness of a material that includes a first electrode, a second electrode, and processing circuitry. The processing circuitry is operatively connected to the first electrode and is configured to: 1) apply an oscillating transmit signal at a fixed frequency to the first electrode while the first electrode is affixed to the material, to thereby cause the transmit signal to pass through the material and be reflected at the second electrode as a reflected signal; 2) process the reflected signal received at the first electrode to measure a magnitude of the reflected signal at the fixed frequency; 3) determine the thickness of the material based on the measured magnitude by: a) comparing the determined magnitude to a predefined baseline value to establish a difference, the predefined baseline value corresponding to an initial thickness of the material and being established before the oscillating signal to the first electrode; b) identifying the thickness based on the difference. Note that the second electrode is affixed to the material and disposed in spaced relation to the first electrode and electrically isolated therefrom during the reflection. In some aspects of the system, the processing circuitry is configured to determine the fixed frequency prior to the applying the oscillating signal.

In other aspects, the present disclosure provides a tire assembly that uses one or more methods and/or apparatuses described herein. For example, the tire assembly may include a tire, a first electrode, a second electrode, and processing circuitry. The tire comprises a dielectric material and a metal material embedded therein. The tire has an inner surface and an exterior surface disposed generally opposite to the inner surface. The first electrode is affixed to the inner surface. The second electrode is affixed to the inner surface and disposed in spaced relation to the first electrode and electrically isolated therefrom. The processing circuitry is communicatively connected to the first electrode and configured to: a) apply an oscillating transmit signal at a fixed frequency to the first electrode, to thereby cause the transmit signal to pass through the material and be reflected at the second electrode as a reflected signal; b) process the reflected signal received at the first electrode to measure a magnitude of the reflected signal at the fixed frequency; and c) determine the thickness of the material based on the measured magnitude. The determination of the thickness is achieved by 1) comparing the determined magnitude to a predefined baseline value to establish a difference, the predefined baseline value corresponding to an initial thickness of the material and being established before the transmit signal is applied to the first electrode; and 2) identifying the thickness based on the difference.

The various aspects of the devices and methods discussed herein may be used alone or in any combination. Further, the present invention is not limited to the above features and advantages. Indeed, those skilled in the art will recognize additional features and advantages upon reading the following detailed description, and upon viewing the accompanying drawings.

DETAILED DESCRIPTION

In one or more aspects, the present application is directed to methods of measuring thickness of a material, and/or to related apparatuses. The method generally includes applying an oscillating signal to a first electrode at a fixed frequency, passing the signal through the material to a second electrode, and measuring the magnitude of the signal reflected back to the first electrode. The thickness of the material is determined based on the measured magnitude of the reflected signal by: 1) comparing the determined magnitude to a predetermined baseline to establish a difference; and 2) identifying the thickness based on the difference. The material may be homogenous or heterogeneous, and has dielectric properties which may or may not be uniform throughout. Because the material acts as a dielectric, the measured magnitude of the reflected signal changes as the thickness of the material changes. Thus, the thickness of the material may be determined based on the measured magnitude of the reflected signal. The present invention may be advantageously employed to measure the thickness of a vehicle tire, but the invention is not limited in all aspects to vehicle tire applications.

Figure 1:
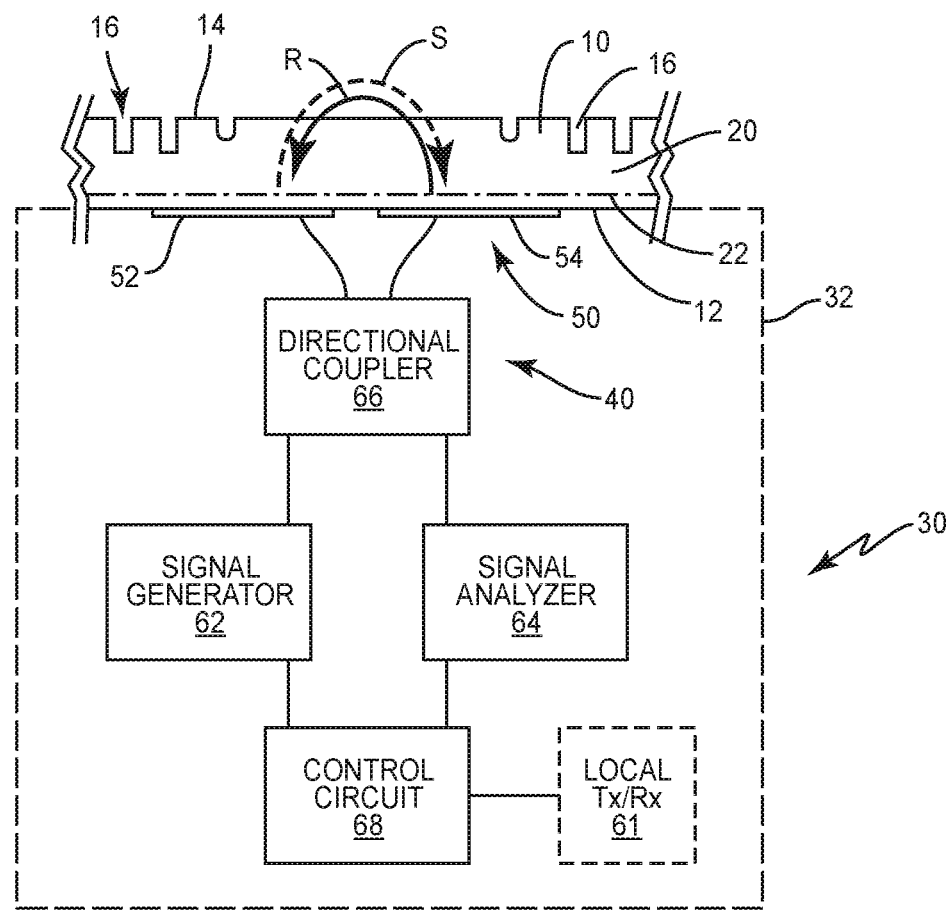
FIG. 1 shows a portion of a tire with a thickness measurement device according to one or more aspects, with a material having a plurality of recesses therein.

In one exemplary aspect, shown in FIG. 1, a measurement circuit (generally indicated at 40) forms a portion of a measurement device 30. The simplified measurement circuit 40 of FIG. 1 includes a sensor assembly 50, a signal generator 62, a signal analyzer 64, a directional coupler 66, and a control circuit 68. Merely as an example, FIG. 1 shows the measurement circuit 40 as being housed in a housing 32 so as to make a portable measurement device 30. However, it should be noted that the measurement circuit 40 does not need to be contained in a portable housing 32. Indeed, some or all of the portions of the measurement circuit 40, in various aspects may be affixed to the material 10, and/or otherwise not disposed in a single housing 32. Thus, the housing 32 in FIG. 1 is shown in dashed lines to indicate that it is optional.

The sensor assembly 50 is positioned near a material 10 to facilitate measurement of the material's thickness. The sensor assembly 50 includes a first electrode 52 and a second electrode 54 that are affixed to the material 10, and disposed proximate to, but spaced from, each other. The first and second electrodes 52,54 are electrically conductive and electrically isolated from each other, and are advantageously in the form of generally rectangular pads. In this aspect, the first electrode 52 and the second electrode 54 are both generally planar, and disposed on the same side of the material 10, disposed physically parallel to each other, and disposed in the same plane, but none of these features are required. Thus, the electrodes 52,54 may alternatively be disposed on opposite sides of the material 10, and/or be disposed in non-parallel orientations, and/or disposed in different planes, and/or may not be planar (e.g., significantly curved, although being substantially planar is believed to be advantageous). For the aspect of FIG. 1, the first electrode 52 is connected to the signal generator 62 and the signal analyzer 64 (both via the directional coupler 66), and may therefore be referred to as the signal electrode 52. For the aspect of FIG. 1, the second electrode 54 is grounded, and acts to reflect the signal transmitted by the signal electrode 52, and may therefore be referred to as the reflection electrode 54.

The signal generator 62 generates an oscillating signal (AC signal) at a frequency. During the main portion of the measurement process, the frequency of the signal is fixed at a fixed frequency and therefore does not vary. The fixed frequency is advantageously in the range of 300-900 MHz (inclusive), such as in the range of 400-500 MHz (inclusive), and advantageously in the range 477-487 MHz (inclusive), and/or at 477 MHz or 487 MHz. The signal generated by the signal generator 62 is applied to the signal electrode 52 and causes a transmit signal S to be emitted by the signal electrode 52. In some aspects, the fixed frequency is advantageously such that the physical dimensions of the electrodes 52,54 and the relevant portion of the material 10 is less than 1/10th the wavelength of transmit signal S as it traverses the system (the electrodes 52,54 and the material 10). In this regard, it should be noted that wavelength depends on the medium the electromagnetic energy is traversing, being shorter in most mediums than it is in free space. Further, the fixed frequency is advantageously such that it is in the general range where the system has a resonance. In some aspects, the signal generator 62 may take the form of a voltage controlled oscillator.

The signal generator 62 is connected to the signal electrode 52 via the directional coupler 66. The directional coupler 66 also connects the signal electrode 52 to the signal analyzer 64. The directional coupler 66 acts in a conventional fashion to separate the applied signal S from the reflected signal R such that the applied signal S from the signal generator 62 is routed to the signal electrode 52, and the reflected signal R is routed to the signal analyzer 64. The reflected signal R may advantageously also be amplified if desired, provided the amplification is consistent. It should be noted that the directional coupler 66 may not be required in all aspects, and alternative aspects may use other signal cancellation arrangements, if desired.

The signal analyzer 64 acts, in a conventional fashion, to convert the reflected signal R to a form suitable for input to the control circuit 68, so as to provide information about one or more parameters of the reflected signal R. For example, the signal analyzer 64 may be configured to vary its output voltage based on the signal strength (magnitude) of the reflected signal R at the fixed frequency. In the field of RF energy propagation, the ratio of reflected signal R to the applied signal S is sometimes referred to as the $S_{11}$ parameter, although this parameter may depend advantageously primarily on the electric field between the electrodes 52,54, including that part of the electromagnetic field that passes through the material 10 whose thickness is being measured. Note that transmit signal S, and reflected signal R, are conceptually variations in that electromagnetic field, but are typically referred to herein as "signals" for simplicity.

The control circuit 68 tracks the magnitude of the reflected signal R, and, in some aspects, controls the signal generator 62 such that the control circuit 68 is aware of the fixed frequency of the signal S being applied to the signal electrode 52. Based on the magnitude of the reflected signal R, the control circuit 68 is able to determine the thickness and/or thickness change of the material 10. To do so, the control circuit 68 initially compares the magnitude M of the reflected signal R to a pre-stored baseline value B to determine a difference D between the magnitude M of the reflected signal R and the baseline value B. Thus, D=B-M. The baseline value B corresponds to an initial thickness of the material 10. Then, the control circuit 68 identifies the thickness T of the material based on the difference D. In identifying the thickness, the control circuit 68, in some aspects, consults a pre-stored look-up table of values which maps changes in signal strength (magnitude) of the reflected signal R to corresponding changes in thickness of the material 10. The look-up table may be internally and/or externally stored; and, in some aspects, is generated by measuring exemplars of the material 10 having different thicknesses. In some aspects, the control circuit 68 identifies the thickness of the material by calculating the thickness based on the difference D and a stored predefined value Y, which may be referred to as an index value Y. For example, the control circuit may divide the difference D (as the dividend) by the stored predefined value Y (as the divisor), with the resulting fraction being the thickness T (e.g., in inches or millimeters). Thus, T=D/Y. The control circuit 68 may take any suitable form, such as a suitably programmed general purpose processor, a programmable logic circuit or field programmable gate array, an ASIC, discrete hardware components, or any combination thereof. The control circuit advantageously has access to suitable internal or external memory (not shown), for storing suitable program/program instructions (software, firmware, code, configuration data, etc.) for carrying out the various processes described herein. The control circuit 68, in combination with the signal generator 62, the signal analyzer 64, and the optional directional coupler 66, may be referred to as processing circuitry.

It should be noted that the control circuit 68 is advantageously configured to communicate the determined material thickness to other device(s) (e.g., a vehicles central control system), such as by being operatively connected to a suitable short range (e.g., BLUETOOTH, ZIGBEE, Radio Frequency Identification (RFID), Wi-Fi, etc.) transmitter/receiver 61 or by other suitable communications techniques.

It should be further noted that the various components of the measurement circuit 40 are powered by one or more power sources (not shown), such as batteries and/or capacitors, which may be centrally located or distributed as is desired, and/or energy obtained from radio frequency (RF) signals received by portions of the measurement circuit 40.

For all the measurement circuit aspects, as discussed above, the material 10 may be homogenous or heterogeneous, and has dielectric properties. Thus, in some aspects, the material 10 is homogeneous, and may optionally have an exterior surface 14 that comprises a plurality of recesses 16 therein, such as the recesses 16 that define treads of a tire. As such, the thickness of the material 10 in the area being measured may not be a single uniform thickness, but may be a composite value, such as an average thickness. In some aspects, the material 10 is heterogeneous, such as a conventional "steel belted" radial tire 10 that has a steel reinforcing mesh or "belt" 22 entirely or partially embedded in a natural or synthetic "rubber" matrix 20. In some aspects, one or more of the components of the heterogeneous material is an electrically conductive metallic material (e.g., the steel belts 22), while at least one other of the components is dielectric (e.g., the rubber 20).

Figure 2:
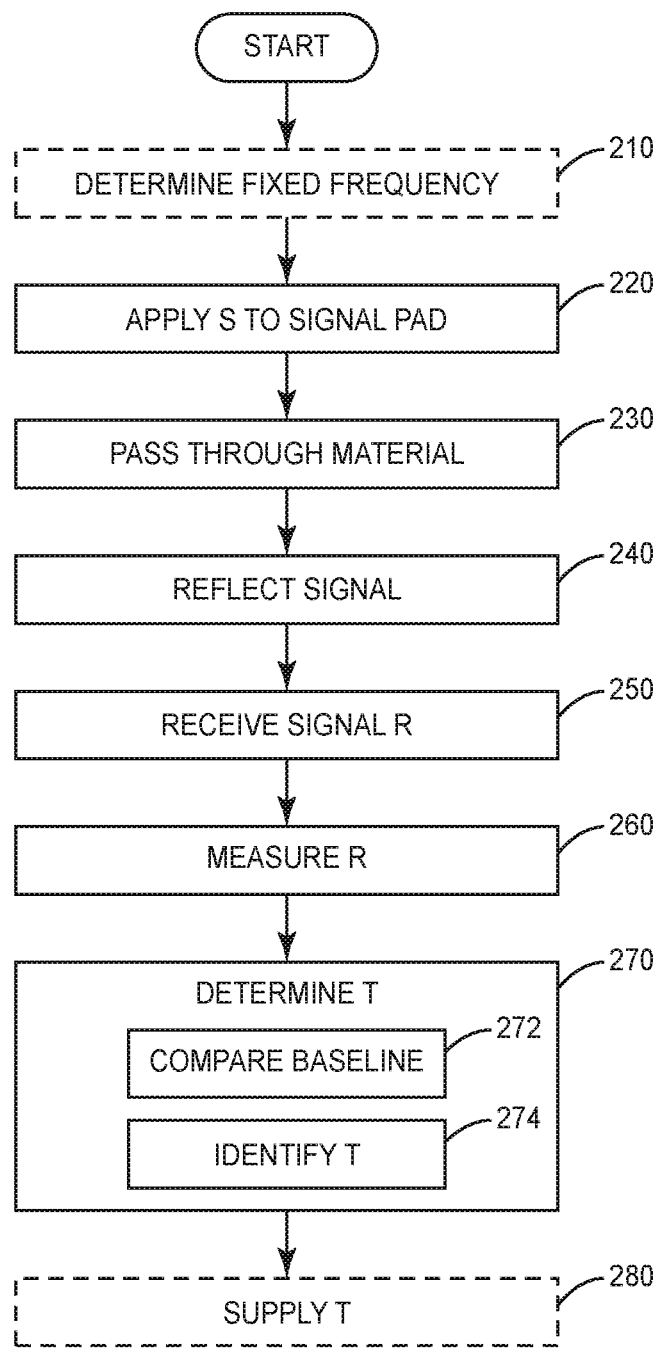
FIG. 2 shows a simplified process flow chart for one or more aspects.

With reference to FIG. 2, a method (200) of measuring the thickness may start by applying signal S to the signal electrode 52 (step 220) at a fixed frequency. Signal S is transmitted by the signal electrode 52 and passes through the material (step 230), and is reflected by the reflection electrode 54 (step 240) to become reflected signal R, and then passes through the material again to be received (step 250) as reflected signal R at the signal electrode 52. Note that while steps 220-250 are shown as sequential in FIG. 5, these steps actually occur in overlapping fashion, given that that propagation delay is typically significantly less than the transmission/reception duration. At step 260, the magnitude of the reflected signal R is measured. The thickness of the material is then determined (step 270) based on the measured magnitude of the reflected signal R. As described above, the thickness is determined by comparing (step 272) the determined magnitude to a predefined baseline to establish a difference. The thickness is then identified based on the difference (step 274). In some aspects, the identification (step 274) is achieved by consulting an internal and/or external pre-stored look-up table of values which maps a difference in signal strength (magnitude) of the reflected signal R to a difference in thickness of the material. In some aspects, the identification (step 274) is achieved by calculating the thickness based on the difference in signal strength (magnitude) of the reflected signal R and a stored predefined value. In some aspects, the process proceeds to optional step 280 where the determined thickness is supplied to other electronics for subsequent processing and/or displayed, as is appropriate.

In some aspects, the method 200 may optionally include determining the fixed frequency (step 210) of the signal S to be applied to the signal electrode 52. This setting of the fixed frequency may be via the control circuit 68 sending appropriate instructions/inputs to the signal generator 62. The setting of the fixed frequency is done prior to the applying the signal S at the fixed frequency (step 220). In some aspects, the fixed frequency may be determined by the control circuit 68 based on information about the material, such as by being based on the manufacturer and model of the tire 10, which may be manually input or determined by any known identification means (e.g., RFID tag associated with the tire 10, optical detection of the tire 10, etc.). In some aspects, the determining the fixed frequency includes 1) transmitting a sweep signal from the first electrode 52 while the AC frequency of the sweep signal is varied over time so that the signal is transmitted at a plurality of frequencies in corresponding time intervals; 2) determining a resonant frequency based on a reflection of the sweep signal by the second electrode 54; and 3) setting the fixed frequency as being within 20% of the determined resonant frequency. Thus, in some aspects, the measurement device 30 may be used to transmit the sweep signal from the signal electrode 52 so that the frequency thereof varies over time such that the sweep signal has a different frequency in different measurement time intervals. The variation of frequency may be done by sweeping a measurement frequency band in a continuous fashion, sweeping in a stepwise fashion, by randomly varying the frequency within the measurement frequency band, or in any other suitable fashion. The frequencies of the sweep signal are advantageously all in the range of 100-1000 MHz (inclusive), but other and/or larger frequency ranges may be used. The control circuit 68 tracks the signal strength of the reflected signal received at the signal electrode 52 over time. In addition, the control circuit 68 controls the signal generator 62, such that the control circuit 68 is aware of the frequency of the signal S being transmitted by the signal electrode 52. Accordingly, the control circuit 68 is able to track the attenuation vs. frequency response of the system formed by the signal electrode 52, the material 10, and the reflection electrode 54. Based on the monitored attenuation vs. frequency response, the control circuit 68 is able to determine a resonant frequency of the system, with the resonant frequency being the frequency at which the attenuation of the reflected signal R is greatest (a local minima for the signal strength of the received signal) within the measurement frequency band. The resonant frequency may the first resonant frequency of the system, or the second resonant frequency of the system. The resonant frequency may be determined from the signal strength measurements at different frequencies using any suitable computational techniques, such as continuous wavelet transforms. For example, the control circuit 68 may compare the power of the received signal at the various transmit frequencies, and identify as the resonant frequency the frequency at which a minimum power of the received signal is noted, either by simply identifying the corresponding frequency, or by employing suitable interpolation if further frequency granularity is needed. For additional information regarding resonant frequency determination, see U.S. Pat. No. 9,797,703. Once the resonant frequency is determined, the fixed frequency is set as being within 20% of the determined resonant frequency, such as by being set at a frequency value that is within 10% of the determined resonant frequency, or being set at 5% lower than the determined resonant frequency, or being set at twenty MHz lower. Note that while a sweep signal is used in step 210, the signal S applied to the signal electrode 52 during steps 220-270 is not swept through frequencies, but is instead a fixed frequency.

Figure 3:
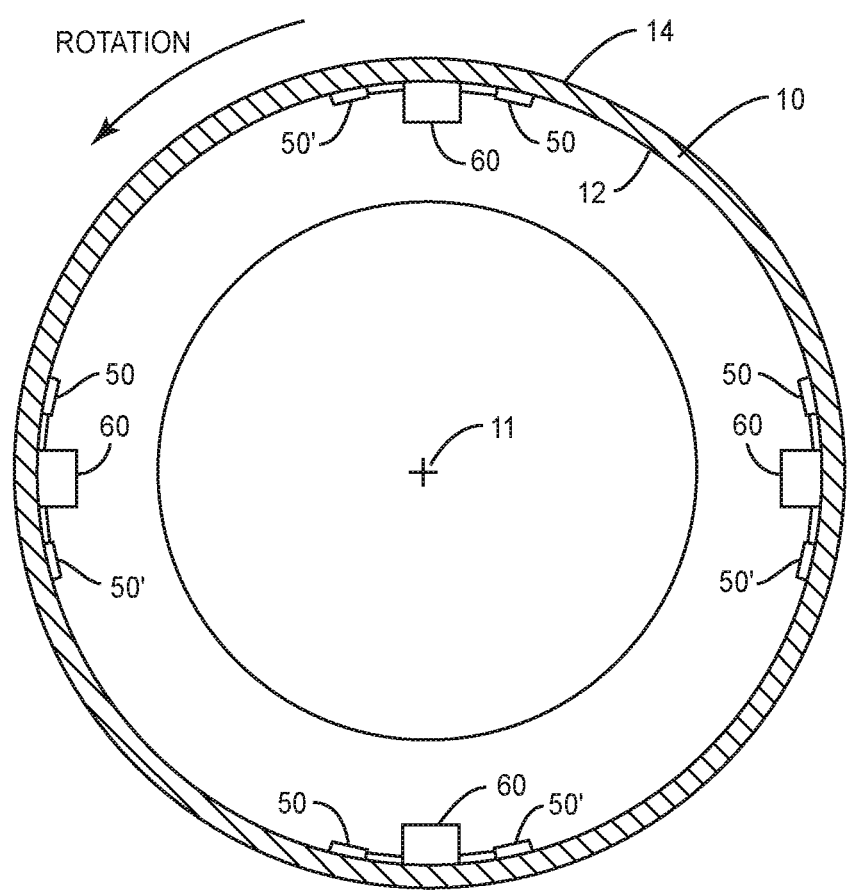
FIG. 3 shows a cross-section of a tire with multiple measurement circuits mounted to an inside surface thereof.
Figure 4:
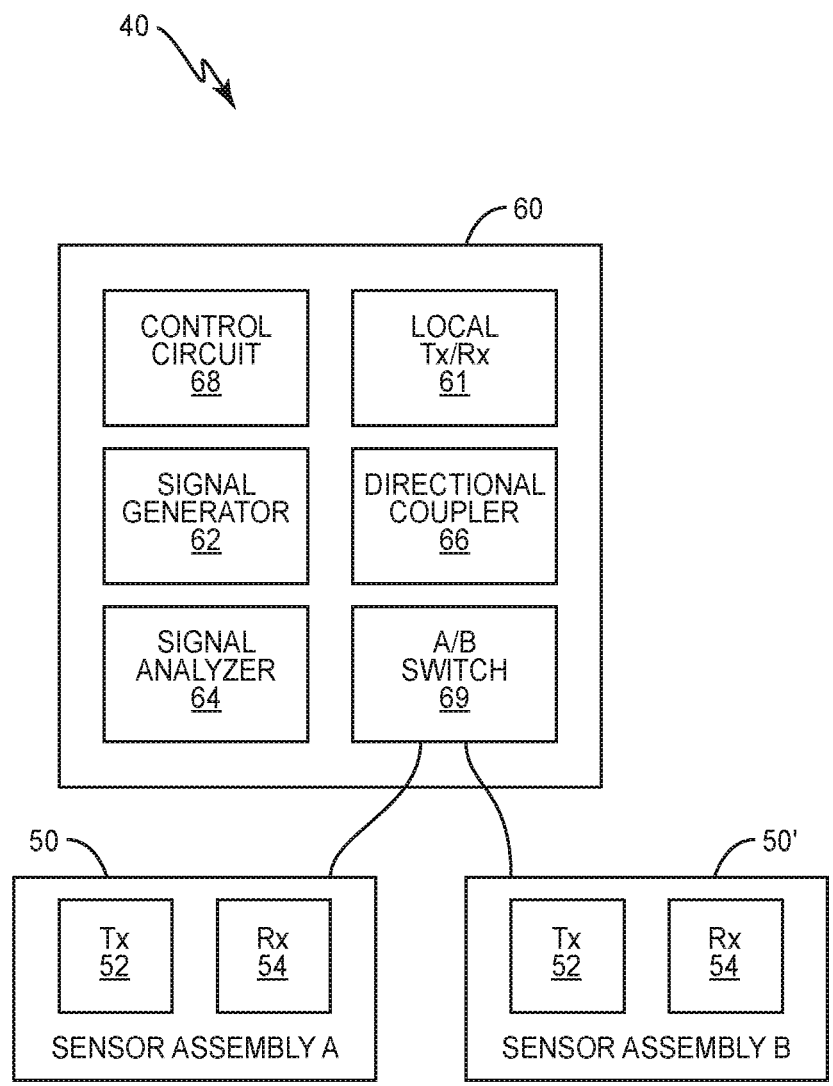
FIG. 4 shows a dual sensor assembly measurement circuit of the type shown in FIG. 3.

Using a mounted vehicle tire (tire 10 mounted on a wheel) as an exemplary environment, the measurement circuit 40 may be mounted to the inner surface 12 of the tire 10, with the signal electrode 52 and reflection electrode 54 abutting the inner surface 12 of the tire 10. If only a single measurement circuit 40 is to be employed, suitable counterweight(s) (not shown) are advantageously added to the associated wheel and/or tire 10 to offset the mass of the measurement circuit 40 so as to maintain rotational balance. While only a single measurement circuit 40 may be used, it is believed advantageous if multiple measurement circuits 40 are employed, with the corresponding sensor assemblies 50 distributed to suitable spaced apart locations around the tire 10. In some aspects, each sensor assembly 50 may have a corresponding dedicated control circuit 68; in other aspects, the sensor assemblies 50 may share one or more control circuits 68, and/or signal generators 62, and/or signal analyzers 64, and may be time multiplexed. For example, as shown in FIGS. 3-4, one approach is to utilize a common main circuit 60 connected to a plurality of sensor assemblies 50,50', advantageously with a plurality of such multi-sensor assembly measurement circuits disposed around the tire 10 in spaced relation to each other. The main circuit 60 includes the control circuit 68, the signal generator 62, the signal analyzer 64, the directional coupler 66, the local transmitter/receiver 61, and an A/B switch 59. Sensor assembly 50 and sensor assembly 50' connect to the main circuit 60 via the A/B switch 69, each with their own signal and reflection electrodes 52,54. The A/B switch 69 may be used to switch between the sensor assemblies 50,50' so that the same main circuit 60 may be used to determine the thickness at two different locations without being moved. Of course, A/B switch 69 may instead be a suitable multiplexer/demultiplexer, as is desired. Further, this approach to multi-sensor assembly measurement circuits may be expanded so that a single main circuit 60 is connected to and uses three, four, or more sensor assemblies 50, rather than just two sensor assemblies 50,50' illustrated in FIGS. 3-4.

Continuing with the mounted vehicle tire 10 as an exemplary environment, in some aspects, portions of the measurement circuit 40 may be disposed outside the tire 10, rather than the entirety of the measurement circuit 40 being disposed inside the tire 10. In one such example, the sensor assembly 50 may be mounted to the interior surface of the tire 10, and a suitable short range transmitter/receiver device pair (e.g., a BLUETOOTH transmitter/receiver pair, a ZIGBEE transmitter/receiver pair, an RFID transmitter/receiver pair, etc.) (not shown) interposed between the control circuit 68 and the balance of the measurement circuit 40, so that the control circuit 68 is mounted in a fixed location (e.g., on the corresponding vehicle wheel well), and communicates via the intervening wireless link with the sensor assembly 50 and other portions of the measurement circuit 40.

As mentioned above, in some aspects, the measurement circuit 40 may be fully contained in a suitable housing 32 to make a self-contained portable measurement device 30. Alternatively, portions of the measurement circuit 40 may be contained in a housing 32, with other portions disposed outside the housing 32, on or near the material 10. In other aspects, portions of the measurement circuit 40 may be disposed in various locations on or near the material 10, and either mounted to the material 10 so as to move therewith, or physically decoupled from the material 10 to allow for to one or more degrees of freedom of relative movement, without any housing 32.

While the discussion above has generally been in the context of a tire 10, or at least used a tire 10 as an exemplary material 10, such is not required. The measurement circuit 40 may be used to measure the thickness of a variety of materials, not just tires. By way of example, other illustrative materials 10 include rubber, wood, plaster, glass, sheet rock, drywall, and the like. Also, the measurement circuit 40, in various aspects, may be used to measure the thickness of any material that is heterogeneous, with at least one component that is electrically conductive, and at least one component that is dielectric. Similarly, the measurement circuit 40, in various aspects, may be used to measure the thickness of any material that is at least partially dielectric and has an exterior surface that comprises a plurality of recesses therein, such as grooves, channels, areas between projections, and the like.

The measurement circuit 40 may be formed from conventional discrete components. Alternatively, one or more portions of the measurement circuit 40 may be formed of thin film materials, in a fashion similar to an RFID tag. Still further, one or more of the components may be formed by a printing process employing nanoparticles, either directly onto a surface of the material and/or onto a suitable substrate that is adhered to the material's surface, as is desired.

In some aspects, the directional coupler 66 may be optionally omitted, with the first electrode 52 operatively connected to the signal generator 62 and the second electrode 54 operatively connected to ground, by direct lines or otherwise. As can be appreciated, suitable precautions (e.g., cancellation mixer arrangements) are advantageously taken to eliminate error inducing cross-talk between the transmit signal S and the reflected signal R for such aspects.

In some aspects, the first and second electrodes 52,54 may both be substantially rectangular pads, with a size of 5 mm by 5 mm and made from carbon nanotube materials with an aerosol jet printing process (see U.S. Patent Application Publication 2017/0347460, entitled "Stretchable Electrically Conductive Layer Formation By Aerosol Jet Printing On Flexible Substrate"); the first and second electrodes 52,54 may be spaced from each other by a gap of approximately 150 um; and the fixed frequency may be in the range 477 MHz to 487 MHz for a system having a second resonant frequency of about 510 MHz. An experimental system with this configuration was able to reliably identify 1 mm changes in thickness in a tire, with a baseline thickness of the tire being about 1.5 cm.

The disclosures of any patents/applications disclosed herein are hereby incorporated herein by reference in their entirety.

The present invention may, of course, be carried out in other ways than those specifically set forth herein without departing from essential characteristics of the invention. The present aspects are to be considered in all respects as illustrative and not restrictive, and all changes coming within the meaning and equivalency range of the appended claims are intended to be embraced therein.

What is claimed is:

1. A method of determining a thickness of a material, the method comprising:
    applying an oscillating transmit signal to a first electrode affixed to the material;
        wherein the transmit signal is applied at a fixed frequency;
    passing the transmit signal through the material;
    reflecting the transmit signal at a second electrode after the transmit signal has passed through the material, the second electrode disposed in spaced relation to the first electrode and electrically isolated therefrom; the second electrode affixed to the material; wherein the first and second electrodes are disposed on a same side of the material;
    receiving the reflected signal at the first electrode; wherein the reflected signal is oscillating at the fixed frequency;
    measuring a magnitude of the reflected signal at the fixed frequency;
    determining the thickness of the material based on the measured magnitude by:
        comparing the determined magnitude to a predefined baseline value to establish a difference, the predefined baseline value corresponding to an initial thickness of the material and being established before the applying the oscillating signal to the first electrode; and
        identifying the thickness based on the difference.

2. The method of claim 1, further comprising determining the fixed frequency prior to the applying the oscillating signal.

3. The method of claim 2, wherein the determining the fixed frequency comprises:
    transmitting a sweep signal from the first electrode sweeping a frequency band while a frequency of the sweep signal is varied over time so that the signal is transmitted at a plurality of frequencies in corresponding time intervals;
    determining a resonant frequency based on a reflection of the sweep signal by the second electrode;
    setting the fixed frequency as being within 20% of the determined resonant frequency.

4. The method of claim 3, wherein the setting the fixed frequency comprises setting the fixed frequency to be less than the determined resonant frequency.

5. The method of claim 1, wherein the first electrode and the second electrode are disposed substantially parallel to each other.

6. The method of claim 1, wherein the identifying the thickness comprises using the difference to reference a look-up table of stored values.

7. The method of claim 1, wherein the identifying the thickness comprises calculating the thickness based on the difference and a stored predefined value.

8. The method of claim 1, wherein the material comprises metal embedded in a dielectric material.

9. The method of claim 8, wherein the material comprises a portion of a vehicle tire.

10. The method of claim 9, wherein the metal comprises a steel reinforcing mesh for the vehicle tire.

11. The method of claim 1, wherein the fixed frequency is in the range 300 MHz to 900 MHz.

12. The method of claim 11, wherein the fixed frequency is in the range 477 MHz to 487 MHz.

13. A measurement system for determining a thickness of a material, the system comprising:
    a first electrode;
    a second electrode;
    processing circuitry operatively connected to the first electrode; wherein the processing circuitry is configured to:
        apply an oscillating transmit signal at a fixed frequency to the first electrode while the first electrode is affixed to the material, to thereby cause the transmit signal to pass through the material and be reflected at the second electrode as a reflected signal; wherein the first and second electrodes are disposed on a same side of the material;

process the reflected signal received at the first electrode to measure a magnitude of the reflected signal at the fixed frequency; wherein the reflected signal is oscillating at the fixed frequency;

determine the thickness of the material based on the measured magnitude by:

comparing the determined magnitude to a predefined baseline value to establish a difference, the predefined baseline value corresponding to an initial thickness of the material and being established before the oscillating signal to the first electrode; and identifying the thickness based on the difference;

wherein the second electrode is affixed to the material and disposed in spaced relation to the first electrode and electrically isolated therefrom during the reflection.

14. The measurement system of claim 13, wherein the processing circuitry is configured to determine the fixed frequency prior to the applying the oscillating signal.

15. The measurement system of claim 14, wherein the processing circuitry is configured to determine the fixed frequency by:

transmitting a sweep signal from the first electrode sweeping a frequency band while a frequency of the sweep signal is varied over time so that the signal is transmitted at a plurality of frequencies in corresponding time intervals;

determining a resonant frequency based on a reflection of the sweep signal by the second electrode;

setting the fixed frequency as being within 20% of the determined resonant frequency.

16. The measurement system of claim 13, wherein the processing circuitry is configured to identify the thickness using the difference to reference a look-up table of stored values.

17. The measurement system of claim 13, wherein the processing circuitry is configured to identify the thickness by at least one of:

calculating the thickness based on the difference and a stored predefined value; and using the difference to reference a look-up table of stored values.

18. The measurement system of claim 13, wherein the fixed frequency is in the range 300 MHz to 900 MHz.

19. The measurement system of claim 18, wherein the fixed frequency is in the range 477 MHz to 487 MHz.

20. A tire assembly, comprising:

a tire comprising a dielectric material and a metal material embedded therein; the tire having an inner surface and an exterior surface disposed generally opposite to the inner surface;

a first electrode affixed to the inner surface;

a second electrode affixed to the inner surface and disposed in spaced relation to the first electrode and electrically isolated therefrom;

processing circuitry communicatively connected to the first electrode and configured to:

apply an oscillating transmit signal at a fixed frequency to the first electrode, to thereby cause the transmit signal to pass through the material and be reflected at the second electrode as a reflected signal; material; wherein the first and second electrodes are disposed on a same side of the material;

process the reflected signal received at the first electrode to measure a magnitude of the reflected signal at the fixed frequency; wherein the reflected signal is oscillating at the fixed frequency;

determine the thickness of the material based on the measured magnitude by:

comparing the determined magnitude to a predefined baseline value to establish a difference, the predefined baseline value corresponding to an initial thickness of the material and being established before the transmit signal is applied to the first electrode; and identifying the thickness based on the difference.

* * * * *